United States Patent [19]

Moran et al.

[11] Patent Number: 4,591,012
[45] Date of Patent: May 27, 1986

[54] WEIGHING APPARATUS WITH IMPROVED WEIGHING BUCKET

[75] Inventors: Michael J. Moran, Raleigh; Joseph B. Lohr, Chapel Hill, both of N.C.

[73] Assignee: USM Corporation, Farmington, Conn.

[21] Appl. No.: 702,891

[22] Filed: Feb. 19, 1985

[51] Int. Cl.⁴ .................... G01G 19/52; G01G 21/22
[52] U.S. Cl. .................................... 177/145; 222/637; 177/262
[58] Field of Search .............. 177/50, 145, 262; 222/630, 637

[56] References Cited

U.S. PATENT DOCUMENTS 3,620,316 11/1971 Henry et al. .......................... 177/50
3,642,128 2/1972 Westwood et al. ............. 177/50 X
4,437,527 3/1984 Omae et al. .......................... 177/25

FOREIGN PATENT DOCUMENTS 873718 7/1961 United Kingdom ................ 222/637

OTHER PUBLICATIONS

Paper entitled *A Short Course on Transvector TM Air Flow Amplifiers With Application Notes*, Vortec Corporation, 1976 (8 pages).

Primary Examiner—George H. Miller, Jr.
Attorney, Agent, or Firm—Leydig, Voit & Mayer, Ltd.

[57] ABSTRACT

A weighing bucket receives product dumped from an overlying holding bucket and causes an underlying load cell to produce an electrical signal representative of the weight of the product in the weighing bucket. After being weighed, the product is swept out of the weighing bucket by a high volume blast of low pressure air produced by an air entraining nozzle. As a result of using air to empty the weighing bucket, the weighing bucket requires no doors or other moving parts and thus may be constructed with high stiffness and with a high natural frequency to reduce low frequency disturbances of the weight signal and to improve the accuracy of such signal as well as to reduce the time required for the weighing cycle.

7 Claims, 1 Drawing Figure

U.S. Patent    May 27, 1986    4,591,012
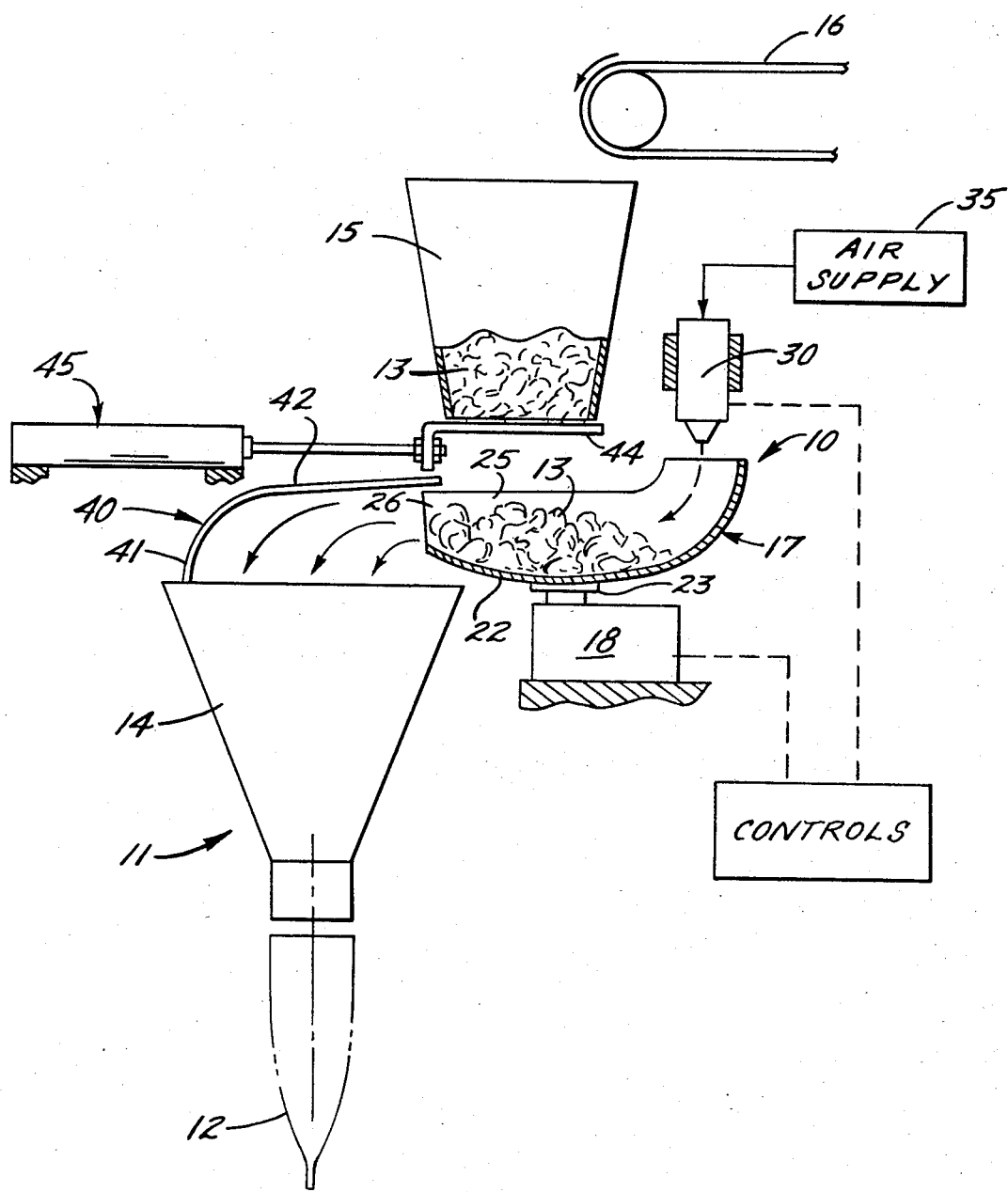

WEIGHING APPARATUS WITH IMPROVED WEIGHING BUCKET

BACKGROUND OF THE INVENTION

This invention relates generally to apparatus for weighing product and, more particularly, to a computerized scale for weighing product just prior to packaging of the product by an automatic packaging machine.

In general, a computerized scale of the foregoing type includes a series (e.g., ten) of so-called weighing buckets each associated with an underlying load cell or other means for producing an electrical signal representative of the weight of product in the bucket. Located above each weighing bucket is a holding bucket which contains a quantity of the product to be packaged. During each cycle, each empty weighing bucket is filled with product by momentarily opening the overlying holding bucket and allowing the product to fall into the weighing bucket. The weight of the product dropped into each weighing bucket is substantially less than the total weight of product which subsequently is placed in each package by the packaging machine.

After all of the weighing buckets have been filled, a computer responds to the weight signals produced by the different load cells, adds the weights in various combinations of weighing buckets and then selects the particular combination of buckets that meets the minimum statistical weight for the package to be filled while providing the least excess weight. The weighing buckets of that particular combination then are emptied and the product therein is delivered to the packaging machine to be deposited in the package.

Weighing buckets for conventional commercially available computer scales include doors which move to open positions to dump the product from the buckets after the product has been weighed. Because of the door and the need to open the weighing bucket, the rigidity of the bucket is reduced and its natural frequency is decreased. While high frequency disturbances in the bucket can be electronically filtered from the load cell signal in a relatively easy manner, low frequency disturbances resulting from a door-type bucket having a relatively low natural frequency are more difficult to eliminate and can result in inaccurate readings. In addition, the door of such a weighing bucket must close before the bucket can be re-filled and thus the time required for closing the door increases the time required for the overall weighing cycle.

SUMMARY OF THE INVENTION

The general aim of the present invention is to provide weighing apparatus of the above general type having a new and improved weighing bucket which is emptied in a unique manner avoiding the need for opening the bucket and eliminating the need of a movable door. As a result of the absence of a door, the bucket may be made stiff and rigid and with a high natural frequency so as to reduce low frequency disturbances affecting the weighing signal and thereby improve the accuracy of the scale. Moreover, the doorless weighing bucket may be re-filled immediately after being emptied and without delaying the cycle while awaiting closing of a door.

A more detailed object of the invention is to achieve the foregoing by providing a streamlined and rigid dishlike weighing bucket having no moving parts and by sweeping the product out of the bucket with a high volume blast of low pressure air.

Still another object is to create a low pressure, high volume flow of air for sweeping the product out of the bucket while using a relatively small volume of compressed air from a pressurized source.

The invention also resides in the provision of novel means for opening and closing the holding bucket without fanning the weighing bucket and producing a false weight signal.

These and other objects and advantages of the invention will become more apparent from the following detailed description when taken in conjunction with the accompanying drawings.

BRIEF DESCRIPTION OF THE DRAWINGS

The single figure of the drawings is a schematic side elevational view partially showing an automatic packaging machine and showing new and improved weighing apparatus incorporating the unique features of the present invention.

DETAILED DESCRIPTION OF THE PREFERRED EMBODIMENT

For purposes of illustration, the weighing apparatus 10 of the present invention has been shown in the drawings in conjunction with an automatic packaging machine 11 for making packages 12 and for filling the packages with product 13. In this specific instance, the product is a snack food such as potato chips or similar relatively light and loosely packed flakes or curls.

The packaging machine 11 is of a known design and may, for example, be of the type disclosed in Monsees et al U.S. Pat. No. 4,423,585. It will suffice here to say that the packaging machine automatically makes packages at high speed and includes an upwardly opening funnel 14 which intermittently receives batches of weighed product 13 and directs successive batches to successive packages as the latter are formed. Reference is made to the aforementioned Monsees et al patent for a detailed disclosure of the construction and operation of a packaging machine having a funnel similar to the funnel 14.

The weighing apparatus 10 which has been specifically shown forms part of a computerized scale which weighs the product 13 and insures that the batch of product deposited in each package 12 always meets a specified minimum or statistical weight while exceeding that weight by as little as practically possible. In general, the weighing apparatus includes an upwardly opening holding receptacle or bucket 15 adapted to contain product received from an overhead supply which has been indicated schematically at 16. The holding bucket is periodically opened and drops a quantity of product into an underlying weighing container bucket 17 which rests on a load cell 18 or other force-to-electrical signal transducer. The signal produced by the load cell is representative of the weight of the product in the bucket 17 and is routed to a microprocessor or the like which is incorporated in the block labeled "controls" in the drawings.

In a typical scale, ten groups of holding buckets 15, weighing buckets 17 and load cells 18 are associated with the funnel 14, the weight signal from each of the load cells being transmitted to the microprocessor. The weight of the product deposited in each weighing bucket from its overlying holding bucket is only a fraction of the total weight of the product with which each package 12 is ultimately filled. In the present instance, no more than three ounces of product is dropped into each weighing bucket while the package itself may, for example, be filled with twelve ounces of product.

After all of the weighing buckets 17 have received product 13, the microprocessor adds in all possible combinations the weights represented by the load cell signals and selects the best combination of weights to meet the statistical package weight while minimizing overfilling. The microprocessor then produces a signal to cause emptying of those particular buckets 17 which make up the selected combination. In a given cycle, for example, the microprocessor may cause the second, fourth, fifth, seventh and eighth weighing buckets to empty while the remaining buckets remain filled until selected and emptied during subsequent cycles.

The accuracy of the scale is dependent upon the accuracy of the weight signal received from each load cell 18. Vibration imparted to the weighing bucket 17 during dumping of the product 13 into the bucket causes disturbances in the load cell signal. While high frequency disturbances above thirty Hz. can be electronically filtered from the signal, low frequency disturbances are not so easily filtered and can affect the accuracy of the signal.

In accordance with the present invention, the weighing bucket 17 is emptied in a unique manner enabling the bucket to be made stiff and rigid and to be free of moving parts so that the bucket may possess a high natural frequency to reduce low frequency disturbances in the signal from the load cell 18. Moreover, the manner in which the weighing bucket is emptied reduces the time required for the overall weighing cycle and thus the weighing apparatus 10 of the invention is faster than prior apparatus as well as being more accurate.

More specifically, the weighing bucket 17 of the invention is a rigid, dish-like container which is shaped and streamlined so as to enable the product 13 to be ejected from the bucket by a blast of low pressure air. As shown, the bucket includes a curved bottom wall 22 which is supported on an underlying pedestal 23 associated with the load cell 18. The upper surface of the bottom wall 22 is concavely curved to retain product dropped into the weighing bucket while allowing the product to be swept along the bottom wall when the bucket is emptied. Two laterally spaced and upwardly extending side walls 25 (only one of which is shown) are joined rigidly at their lower ends to the bottom wall 22 and coact with the latter to confine the product. The bucket may be of one-piece stainless steel construction or the various walls may be separately fabricated and welded rigidly together.

The weighing bucket 17 directly underlies the holding bucket 15 and is positioned such that product 13 dropped from the holding bucket comes to rest in and is confined by the holding bucket. The left end of the weighing bucket overlies the funnel 14 and defines a discharge opening 26.

To eject the product 13 from the weighing bucket 17, an air entraining nozzle 30 is positioned above the bucket adjacent the right end thereof and is directed downwardly to cause a blast of air to sweep through the bucket. The nozzle may, for example, be of the type sold by Vortex Corporation and identified as a Model 900 "Flo-Gain" nozzle. Such a nozzle is adapted to receive air at relatively high pressure (e.g., 40 psi.) from a source 35 of filtered compressed air. When the nozzle is pulsed, the high pressure air entrains ambient air and produces a relatively low pressure, high volume flow of air from the nozzle. In this way, the usage of filtered compressed air is kept low but, at the same time, there is produced a relatively gentle blast of air sufficient to sweep the light and fragile product out of the bucket without breaking up the product.

The nozzle 30 is pulsed with pressurized air whenever the microprocessor signals that the particular weighing bucket 17 associated with the nozzle has been selected and should be emptied. As the air sweeps through the bucket, it impinges against the product 13, pushes the product from right-to-left within the bucket and ejects the product out of the discharge opening 26 so that the product may fall into the funnel 14. A deflector 40 confines the product as the product is ejected and directs the product into the funnel. The deflector includes an upwardly extending portion 41 connected to one side of the funnel and further includes a generally horizontally extending portion 42 which closes off the space between the upper end of the funnel and the upper end of the weighing bucket.

The microprocessor causes the nozzle 30 to cut off the blast of air after the elapse of a short predetermined interval sufficient to empty the weighing bucket 17. Immediately thereafter, the holding bucket 15 may be opened to re-fill the weighing bucket since the holding bucket need not wait for the weighing bucket to be closed by doors or the like. Advantageously, the holding bucket 15 is closed by a linearly movable door 44 which is reciprocated back and forth beneath the holding bucket by a reciprocating pneumatic actuator 45. Because the door moves linearly, it produces very little fanning effect on the weighing bucket and thus avoids creating a false weight signal. Also, the lack of fanning enables the product 13 in the weighing bucket to settle quickly and thus product weighing may begin immediately after the door 44 closes.

From the foregoing, it will be apparent that the present invention brings to the art weighing apparatus 10 having a weighing bucket 17 with high natural frequency which improves the accuracy of the weight signal without need of resorting to complex means to eliminate low frequency disturbances. Because the weighing bucket lacks moving parts, it is simple, compact and economical in construction, is trouble-free in service use and need not be restored to a closed position prior to being re-filled.

We claim:

1. Weighing apparatus comprising a container for holding product to be weighed, means for intermittently delivering batches of product to said container, means associated with said container for producing a signal representative of the weight of each batch of product in the container, and means for receiving each batch of product from said container after the product has been weighed, the improvement in said weighing apparatus comprising, pneumatic means for intermittently directing a flow of air into said container and against the batch of product therein to eject such product from said container and into said receiving means.

2. Weighing apparatus as defined in claim 1 in which said pneumatic means comprise a nozzle supplied with pressurized air and having means for causing the pressurized air to entrain ambient air and to induce a low pressure, high volume flow of ambient air out of said nozzle.

3. Weighing apparatus as defined in claim 1 in which said container comprises a pair of upright side walls, a bottom wall extending between and joined rigidly to the lower ends of said side walls and having an upper surface which is convexly curved, there being a laterally facing discharge opening defined between said side walls at one end of said container, said pneumatic means including a nozzle located above said container adjacent the opposite end thereof to cause said flow of air to sweep said product along said bottom wall and out of said discharge opening to said receiving means.

4. Weighing apparatus comprising an upwardly opening container for holding product to be weighed, means for intermittently dropping batches of product into said container, means disposed in underlying relation with said container for producing an electric signal representative of the weight of each batch of product in the container, and means for receiving each batch of product from the container after the product has been weighed, said apparatus being characterized in that said container includes a bottom wall having an upper surface which is concavely curved, a pair of spaced upright side walls having lower ends joined rigidly to said bottom wall, there being a discharge opening defined between said side walls at one end of said container, and pneumatic means located above said container adjacent the other end thereof for intermittently directing a high volume, low pressure blast of air downwardly into said container to sweep said product along said bottom wall and out of said discharge opening to said receiving means.

5. Weighing apparatus as defined in claim 4 in which said pneumatic means comprise a nozzle supplied with pressurized air and having means for causing the pressurized air to entrain ambient air and to induce a low pressure flow of ambient air out of said nozzle.

6. Weighing apparatus as defined in claim 4 in which said means for intermittently dropping said product comprise an upwardly opening receptacle having an open lower end, and means for alternately opening and closing the lower end of said receptacle and comprising a door supported for linear movement beneath the lower end of said receptacle, and means for linearly moving said door between open and closed positions beneath said receptacle.

7. Weighing apparatus as defined in claim 4 in which said receiving means comprise an upwardly opening funnel positioned below said container with one side of the funnel being located adjacent said one end of said container, and a product deflector having a generally horizontal portion located above the funnel and the discharge opening of the container and extending from the container in upwardly spaced relation with the funnel, said deflector also having a generally vertical portion extending downwardly from said horizontal portion to the other side of the funnel, said deflector captivating the product discharged out of said container and directing such product into said funnel.

* * * * *